United States Patent
Murakami et al.

(10) Patent No.: US 11,892,813 B2
(45) Date of Patent: Feb. 6, 2024

(54) CONTROL DEVICE FOR ELECTRIC MOTOR

(71) Applicant: FANUC CORPORATION, Yamanashi (JP)

(72) Inventors: Takafumi Murakami, Yamanashi-ken (JP); Satoshi Ikai, Yamanashi (JP); Tsutomu Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/794,102

(22) PCT Filed: Mar. 17, 2021

(86) PCT No.: PCT/JP2021/010855
§ 371 (c)(1),
(2) Date: Jul. 20, 2022

(87) PCT Pub. No.: WO2021/193290
PCT Pub. Date: Sep. 30, 2021

(65) Prior Publication Data
US 2023/0050838 A1 Feb. 16, 2023

(30) Foreign Application Priority Data
Mar. 23, 2020 (JP) .................. 2020-051597

(51) Int. Cl.
*G05B 23/02* (2006.01)
*G05B 19/4062* (2006.01)
*H02P 29/40* (2016.01)

(52) U.S. Cl.
CPC .......... *G05B 19/4062* (2013.01); *H02P 29/40* (2016.02)

(58) Field of Classification Search
CPC ........ H02P 21/143; H02P 29/40; H02P 23/14; G05B 19/37388; G05B 19/37621
See application file for complete search history.

(56) References Cited

FOREIGN PATENT DOCUMENTS

DE 102018209093 A1 * 12/2018 ........... G05B 19/416
JP 2010148178 A 7/2010
(Continued)

OTHER PUBLICATIONS

PCT International Search Report dated May 18, 2021 for related International Application No. PCT/JP2020/010855, from which the instant application is based, 2 pages.
(Continued)

*Primary Examiner* — Karen Masih
(74) *Attorney, Agent, or Firm* — Fredrikson & Byron, P.A.

(57) ABSTRACT

Provided is a control device capable of automatically determining whether or not an inertia estimation function needs to be activated. The control device 10 is for an electric motor and comprises: a first inertia estimation unit 11 that estimates whether or not there has been a change in the inertia of an object to be driven, on the basis of at least one among first information pertaining to an operation program or operation settings for a device comprising the electric motor, second information obtained from a detection device for detecting the shape of the object to be driven by the electric motor, and third information indicating the operation state of the electric motor; and a second inertia estimation unit 12 that estimates the inertia of the object to be driven if the first inertia estimation unit 11 has estimated that there has been a change in the inertia of the object to be driven.

9 Claims, 12 Drawing Sheets

(56) References Cited

FOREIGN PATENT DOCUMENTS

| | | |
|---|---|---|
| JP | 2014007816 A | 1/2014 |
| JP | 2016181193 A | 10/2016 |
| JP | 2019003646 A | 1/2019 |
| JP | 2019004584 A | 1/2019 |
| WO | 2020008587 A1 | 1/2020 |

OTHER PUBLICATIONS

English Abstract and Machine Translation of Japanese Publication No. 2019004584 A, published Jan. 10, 2019, 18 pages.
English Abstract and Machine Translation of Japanese Publication No. 2019003646 A, published Jan. 10, 2019, 20 pages.
English Abstract and Machine Translation of Japanese Publication No. 2016181193 A, published Oct. 13, 2016, 25 pages.
English Abstract and Machine Translation of Japanese Publication No. 2014007816 A, published Jan. 16, 2014, 22 pages.
English Abstract and Machine Translation of Japanese Publication No. 2010148178 A, published Jul. 1, 2010, 21 pages.
English Abstract and Machine Translation of International Publication No. WO 2020008587 A1, published Jan. 9, 2020, 19 pages.

* cited by examiner

CONTROL DEVICE FOR ELECTRIC MOTOR

RELATED APPLICATIONS

This application is a 35 U.S.C. 371 national stage filing from International Application No. PCT/JP2021/010855, filed Mar. 17, 2021, which claims priority to Japanese Application No. 2020-051597, filed Mar. 23, 2020, the teachings of which are incorporated herein by reference.

TECHNICAL FIELD

The present invention relates to a controller for an electric motor.

BACKGROUND ART

In a system such as a machine tool, which drives each drive axis using an electric motor, the inertia of a driven body including a workpiece, a work table mounting the workpiece, or the like, changes according to the workpiece to be a machining target. Therefore, in order to accurately control each axis in such a machine tool, it is necessary to know the inertia of the driven body accurately. A machine tool with the ability to estimate the inertia of the driven body has been proposed (e.g., Patent Document 1, Patent Document 2, and Patent Document 3).

CITATION LIST

Patent Literature

Patent Document 1: JP 2010-148178 A
Patent Document 2: JP 2014-007816 A
Patent Document 3: JP 2016-181193 A

SUMMARY OF INVENTION

Technical Problem

Since the inertia estimation requires the machine tool to perform certain operations stably, the execution of the inertia estimation function generally takes time. In general, the activation of the inertia estimation function is often performed at the discretion of an operator. A controller capable of automatically determining the necessity of activation of the inertia estimation function is desired.

Solution to Problem

One aspect of the present disclosure is a controller for an electric motor, which includes a first inertia estimating unit configured to estimate whether inertia of a driven body has changed, based on at least one of first information related to an operation program or an operation setting of a device equipped with the electric motor, second information obtained from a detection device configured to detect a shape of the driven body driven by the electric motor, or third information representing an operation state of the electric motor, and a second inertia estimating unit configured to estimate the inertia of the driven body when the inertia of the driven body is estimated by the first inertia estimating unit to have changed.

Effects of Invention

According to the above configuration, the inertia estimation function can be activated by automatically estimating whether the inertia has changed.

From the detailed description of exemplary embodiments of present invention illustrated in the accompanying drawings, these objects, features and advantages of the present invention as well as other objects, features and advantages of the invention will become more apparent.

BRIEF DESCRIPTION OF DRAWINGS

FIG. 8 is a diagram for describing an operation of estimating a change of the inertia of a driven body during a non-machining state or the like.

DESCRIPTION OF EMBODIMENTS

Figure 1:
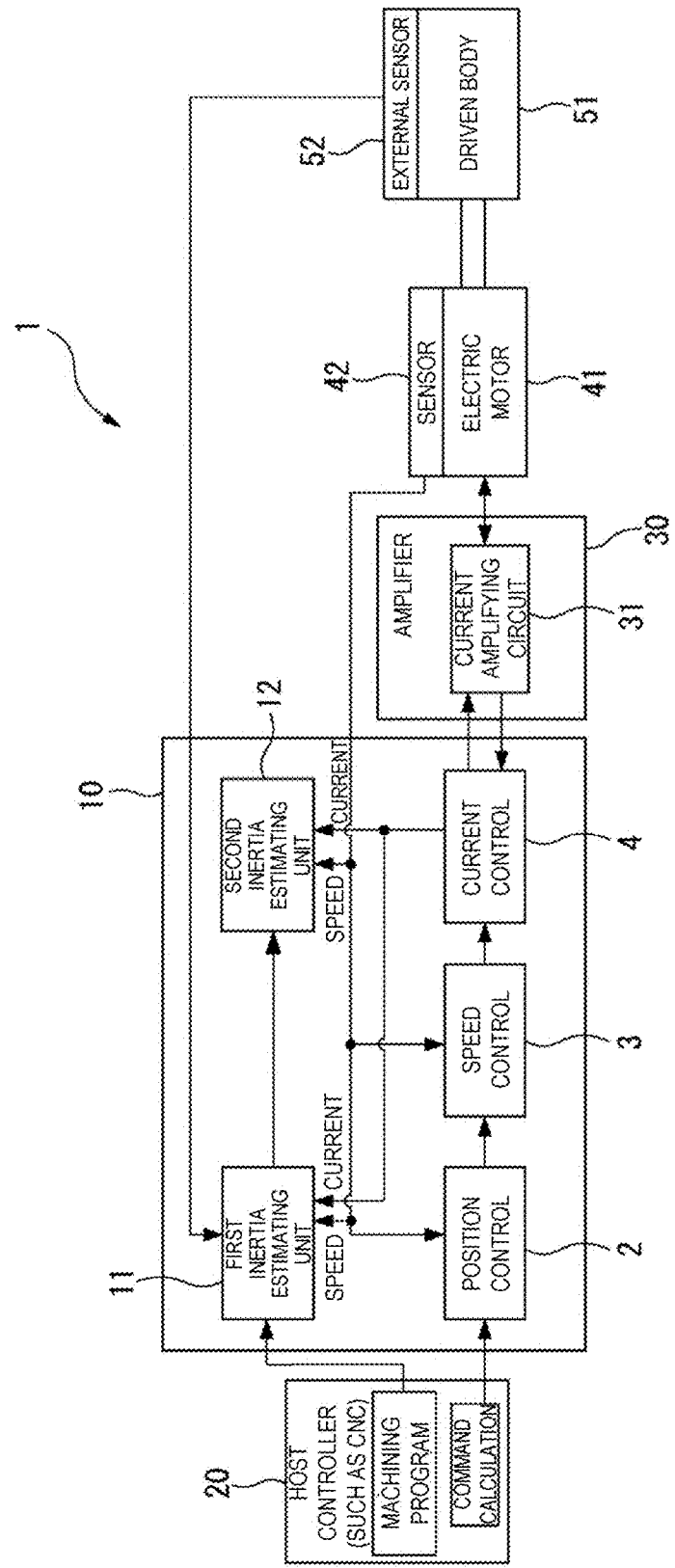
FIG. 1 is a block diagram illustrating a configuration of a system including a controller for an electric motor according to an embodiment.

Embodiments of the present disclosure will now be described with reference to the drawings. In the drawings to be referenced, like components or functions are given like reference signs. For ease of understanding, these drawings have been scaled accordingly. The embodiment illustrated in the drawings is an example for carrying out the present invention, and the present invention is not limited to the embodiments illustrated in the drawings.

FIG. 1 is a block diagram illustrating a configuration of a system including a controller 10 for a synchronous motor according to an embodiment. The controller 10 for a synchronous motor according to the present embodiment (hereinafter referred to simply as "controller") operates a synchronous motor 41 (hereinafter referred to as an electric motor 41), which drives a driven body 51, at a predetermined designated speed by controlling an amplifier 30 based on a position command from a host controller 20 such as a computer numerical control (CNC). The electric motor 41 may be for driving and controlling a spindle axis or a feed axis in a machine tool, for example, or may rotate the joint axis of a robot. The driven body 51 of the electric motor 41 may include a table, an arm, and a workpiece to be attached to or detached from them, or an operating portion of the electric motor 41 itself.

Hereinafter, the system described in FIG. 1 will be described as constituting a machine tool 1. The position, speed and torque of the electric motor 41 are controlled by the controller 10 that executes servo control. The host controller 20 may be connected to respective controllers 10 for each axis.

In the configuration of FIG. 1, the position command generated by the command calculation in the host controller 20 is sent to the controller 10 and received by a position control unit 2. The position control unit 2 transmits a speed command to a speed control unit 3 based on the received position command. The speed control unit 3 transmits a current command to a current control unit 4 based on the received speed command. The current control unit 4 transmits a voltage command to a current amplifying circuit 31 constituting the amplifier 30 for driving the electric motor 41. The electric motor 41 operates at a predetermined designated speed by power input from the current amplifying circuit 31 to drive the driven body 51.

The electric motor 41 is provided with a sensor 42 for detecting the speed and position of the electric motor 41. Data related to the speed and the position detected by the sensor 42 are each fed back to the position control unit 2, the speed control unit 3, and a first inertia estimating unit 11 and a second inertia estimating unit 12 in the controller 10.

The first inertia estimating unit 11 estimates whether the inertia of a driven body has changed based on at least one of first information related to an operation program (machining program) or an operation setting of the machine tool 1, second information obtained from a detection device (external sensor 52) for detecting a shape of a driven body driven by the electric motor 41, or third information representing an operation state of the electric motor 41. The second inertia estimating unit 12 executes estimation of the inertia of the driven body when it is estimated by the first inertia estimating unit 11, that the inertia of the driven body has changed.

The inertia estimation by the second inertia estimating unit 12 will be described. The second inertia estimating unit 12, when receiving a signal (start instruction) indicating a change in the inertia of the driven body from the first inertia estimating unit 11, gives an acceleration/deceleration command to the electric motor 41 to execute a specific operation, and estimates the inertia of the driven body 51 based on a speed value fed back from the electric motor 41 and a current value fed back from the amplifier 30. Inertia J [kgm$^2$] of the driven body 51 can be calculated by the following equation using a current value I [A], an acceleration value a [rad/s$^2$], a speed value ω [rad/s] and a torque constant Kt of the synchronous motor.

$$J = Kt \times I/a = Kt \times I/(d\omega/dt) \quad (1)$$

A calculation method of acceleration a=dω/dt in equation (1) will be described. Assume that the speed value ω(t) at a certain time t is fed back from the sensor 42 at a sampling period T. The acceleration a at this time can be calculated as a=(ω(t)−ω(t−T))/T by using the difference between the speed value ω(t) fed back at a certain time t and the speed value ω(t−T) fed back at a time (t−T) that is one sampling period earlier from the time t.

In order to accurately estimate the inertia using the feedback signal as described above, it is necessary to execute the estimation after the torque generated in response to the acceleration/deceleration command is stabilized, so that it takes some time to estimate the inertia. The inertia estimated by the second inertia estimating unit 12 is used for determining the time constant of the acceleration/deceleration command and calculating the speed control gain for determining the responsiveness of the speed control.

A specific operation example in which the first inertia estimating unit 11 estimates whether the inertia of the driven body has changed, will be described below. Specific operation examples include the following.

(1) When the jig has changed (estimation based on the second information)
(2) When the program has changed (estimation based on the first information)
(3) Time interval of the program (estimation based on the first information)
(4) Two-dimensional image by the vision sensor (estimation based on the second information)
(5) Three-dimensional coordinate by the vision sensor (estimation based on the second information)
(6) Number of machining types (estimation based on the first information)
(7) Measurement during non-machining, etc. (estimation based on the third information)
(8) Measurement during constant acceleration (estimation based on the third information)
(9) Estimation from the torque waveform (estimation based on the third information)

In the above operation examples, the operation examples from (1) to (6) are processes mainly executed before the program or the process starts, and the examples from (7) to (9) are processes that can be executed during the operation of the machining program. In the case of the operation examples (4) and (5) using the vision sensor, the processes can be executed while the machining program is in operation.

(1) When the Jig has Changed

Figure 2:
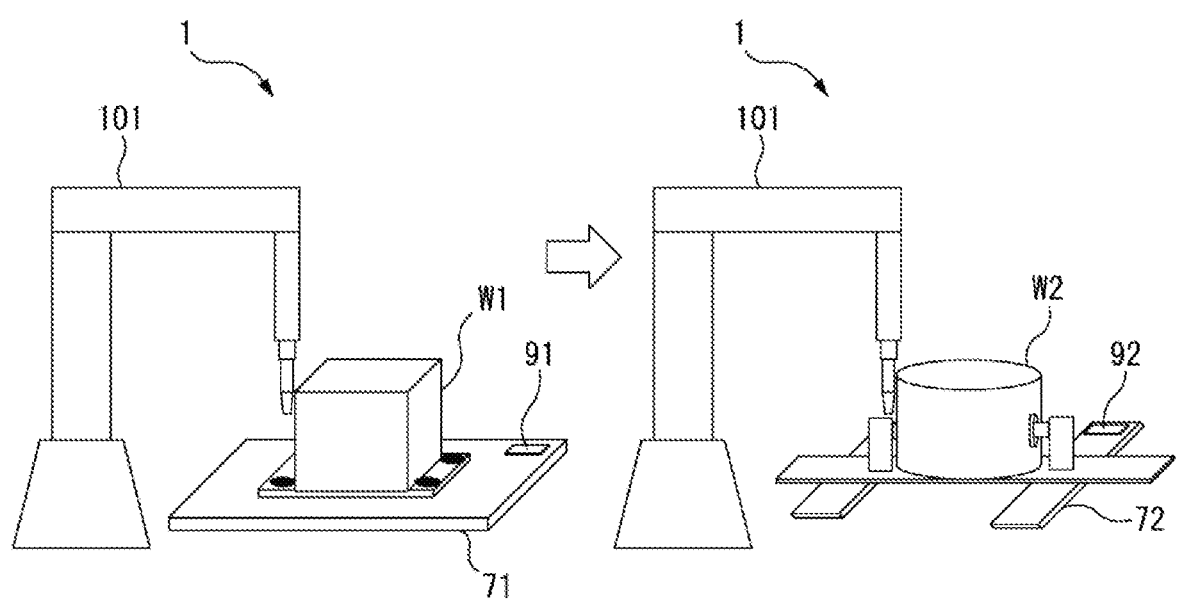
FIG. 2 is a diagram for describing a situation in which a jig has changed in a machine tool.

When the jig for fixing the workpiece has changed, the shape of the workpiece can also be regarded to be different. Based on this, the first inertia estimating unit 11 detects whether the jig fixing the workpiece has changed. When the jig is changed, the first inertia estimating unit 11 estimates that the inertia of the driven body has changed due to a change in the shape of the workpiece. FIG. 2 illustrates a jig on the machine tool 1, a workpiece fixed to the jig, and a spindle support 101. In the case of the present operation example, an identification information retaining body (barcode, IC tag, ID chip, etc.) holding identification information specific to the jig, is attached to the jig. On the left side of FIG. 2, a situation is illustrated in which a jig 71 is used as the jig for fixing a workpiece W1 in the machine tool 1 and machining is performed by a tool attached to the spindle support 101. On the right side of FIG. 2, a situation is illustrated in which a jig 72 different from the jig 71 is used to fix the workpiece W2 different in shape from the workpiece W1 on the machine tool 1.

An identification information retaining body 91 for retaining the identification information of the jig 71, is attached to the jig 71. An identification information retaining body 92 for retaining the identification information of the jig 72, is attached to the jig 72. In this case, an external sensor 52 is a reader for reading the identification information retained by the identification information retaining bodies 91 and 92. By way of example, when identification information retaining bodies 91 and 92 are bar codes, then the external sensor 52 is a bar code reader. The barcode reader is attached to a position in the spindle support 101 of the machine tool 1, where identification information retaining bodies 91 and 92 can be read, for example.

The first inertia estimating unit 11 causes the external sensor 52 to read the identification information retained by the identification information retaining body 91 (or 92) at a predetermined timing before starting the execution of the machining program, for example. When the identification information of the jig 72 read this time is different from the identification information of the jig 71 read last time, the first inertia estimating unit 11 estimates that the inertia has changed due to the change in the shape of the workpiece and causes the second inertia estimating unit 12 to execute the estimation of the inertia.

The present operation example is a method for indirectly detecting that the shape of the workpiece has changed by detecting the shape of the jig. Therefore, an advantage is obtained in a situation in which the workpiece cannot be directly viewed from the position of the external sensor 52.

(2) When the Program Has Changed

Figure 3:
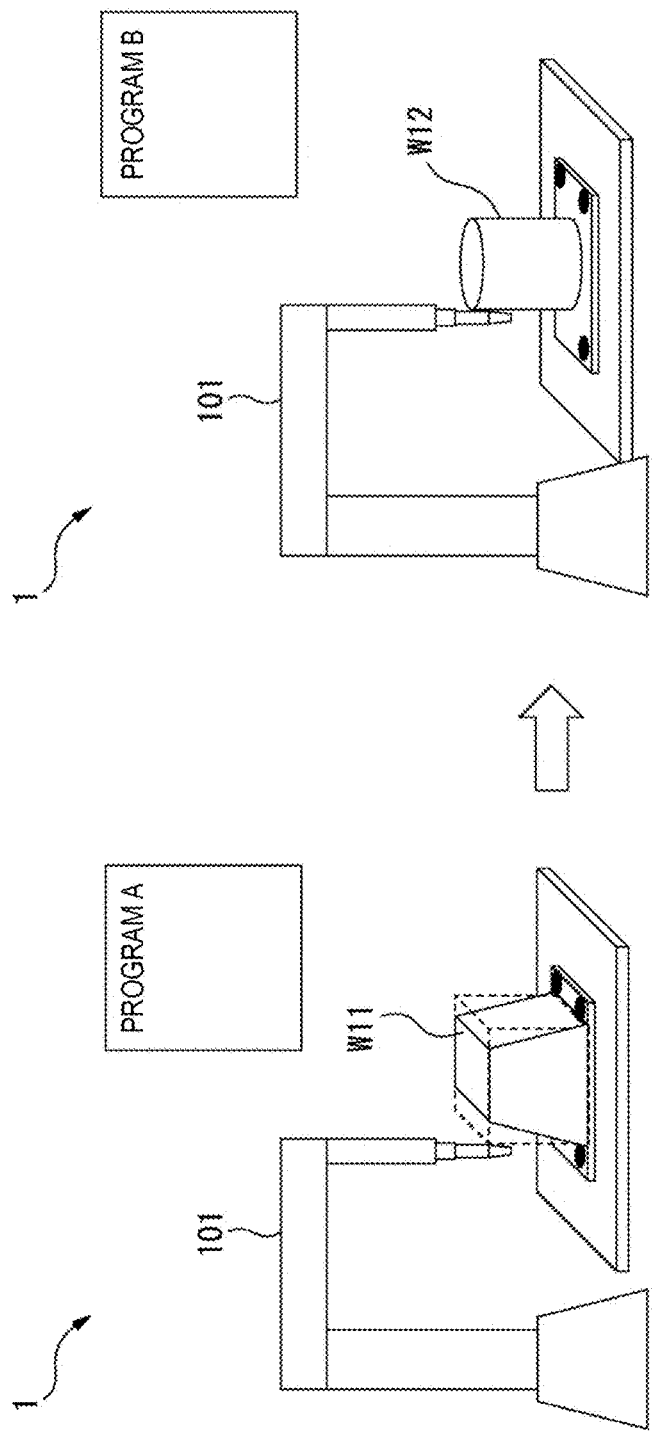
FIG. 3 is a diagram for describing a situation in which a program has changed in a machine tool.

When the machining program becomes different, it can be considered as the case where the shape of the workpiece to be a machining target changes. Based on this, the first inertia estimating unit 11 estimates that the inertia of the driven body has changed due to a change in the shape of the workpiece when the machining program has changed. On the left side of FIG. 3, a situation is illustrated in which the target of machining by a program A in the machine tool 1 is a workpiece W11. On the right side of FIG. 3, a situation is illustrated in which the target of machining by a program B in the machine tool 1 is a workpiece W12 different in shape from the workpiece W11. FIG. 3 illustrates a case where the same jig and the same tool are used in the machining by the program A and the program B.

In this case, the first inertia estimating unit 11 obtains information (program name, etc.) for identifying the machining program from the host controller 20. Then, the first inertia estimating unit 11 estimates that, when the obtained identification information of the program is different from the identification information of the program executed last time, the inertia has changed due to a change in the shape of the workpiece. Next, the first inertia estimating unit 11 causes the second inertia estimating unit 12 to execute the estimation of the inertia.

Whether the program has changed can be determined not only from the program name as an example but also by the following methods.

(a1) The origin position of the workpiece defined in the program is measured at the start of the program. When the difference between the origin position measured at the start of the present program and the origin position measured in the last program exceeds a threshold value, it is determined that the program has changed.

(a2) When a coordinate system not used in the last program is used as a coordinate system (G54 to G59) of the G code for selecting the workpiece coordinate system, it is determined that the program is different. For example, suppose that the workpiece coordinate system used in the last program is only G54 of the G code (i.e., the definition of machining only one face). Suppose that the workpiece coordinate system defined in the present program is G54, G55, and G56 of the G code (i.e., the definition of machining three faces). In this case, the first inertia estimating unit 11 can determine that the program is different, from the difference in the workpiece coordinate system used. These, (a1) and (a2), can also be referred to as information related to the operation setting of the machine tool 1.

(3) Time Interval of the Program

Figure 4:
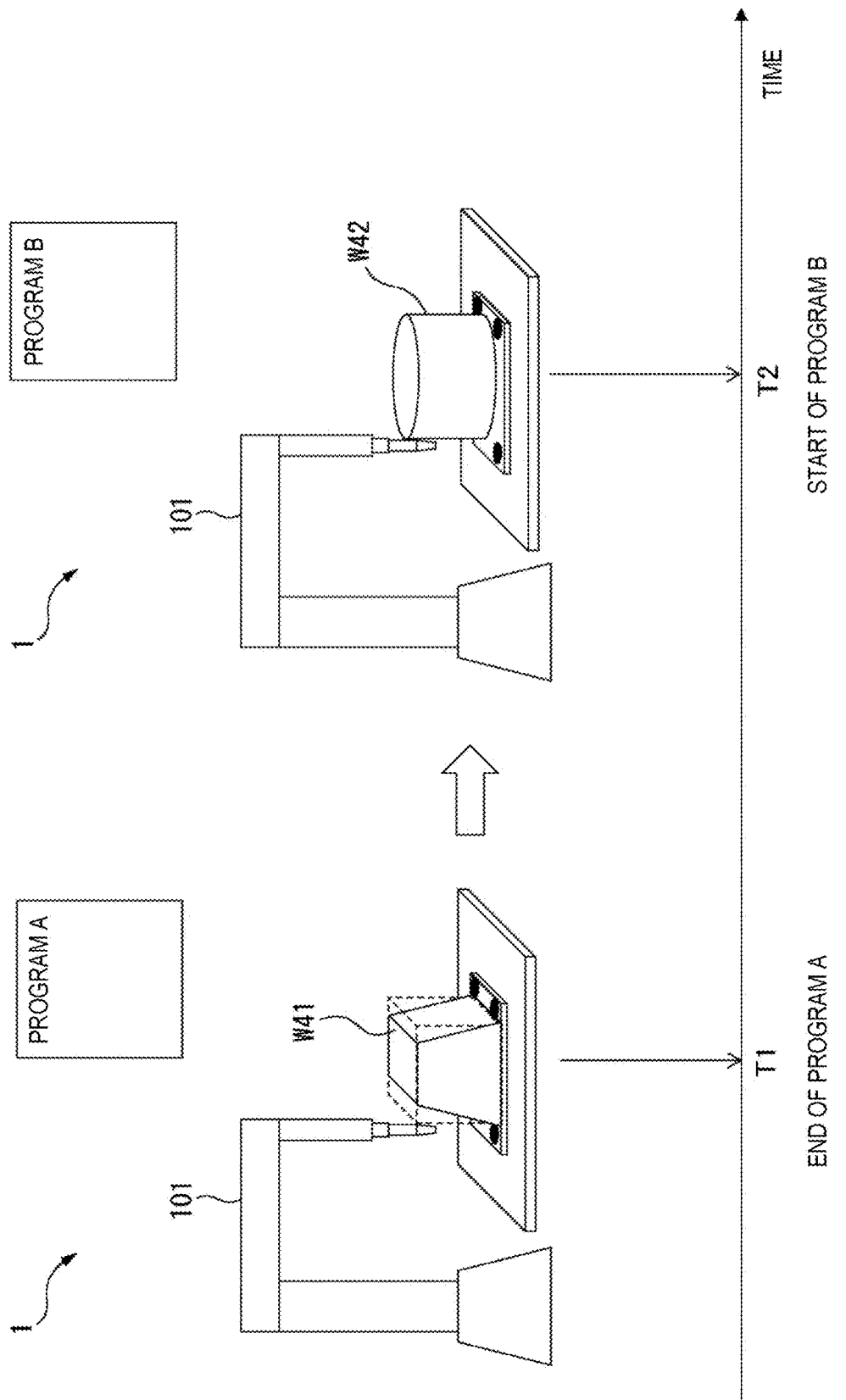
FIG. 4 is a diagram for describing a situation from the end of one program to the start of the next program in a machine tool.

Generally, the same machining program is performed continuously without any time interval. Therefore, when there is a certain time interval between the end of an execution of a certain machining program and the start of the next machining program, it can be considered that this is a situation in which different machining is performed (e.g., a situation where the machining program is different.) and a case in which a change occurs in the shape of the workpiece. Assume the situation illustrated in FIG. 4. In FIG. 4, in the machine tool 1, machining of the workpiece W41 by the program A ends at time T1, and machining of the workpiece W42 by the next program B starts at time T2. The first inertia estimating unit 11 determines that the shape of the workpiece has changed when the interval between the machining end time T1 of the last program A and the start time T2 of the present machining program B exceeds a preset setting value. This setting value can be set and input to the controller 10 by a user through a user interface of the host controller 20, for example. Since this setting value depends on the type of machine tool, the type of machining, the type of target workpiece, etc., the user sets and inputs the setting value while taking these into consideration.

The first inertia estimating unit 11 obtains the time information from the internal clock in the controller 10, stores the end time of the last program A, and obtains the start time of the present program B. The first inertia estimating unit 11 compares the time interval from the end time T1 of the last program A to the start time T2 of the present program B with the preset setting value. When the time interval is larger than the setting value, the first inertia estimating unit 11 estimates that the inertia of the driven body 51 has changed due to a change in the shape of the workpiece, and causes the second inertia estimating unit 12 to execute the estimation of the inertia.

(4) Two-Dimensional Image by the Vision Sensor

Figure 5:
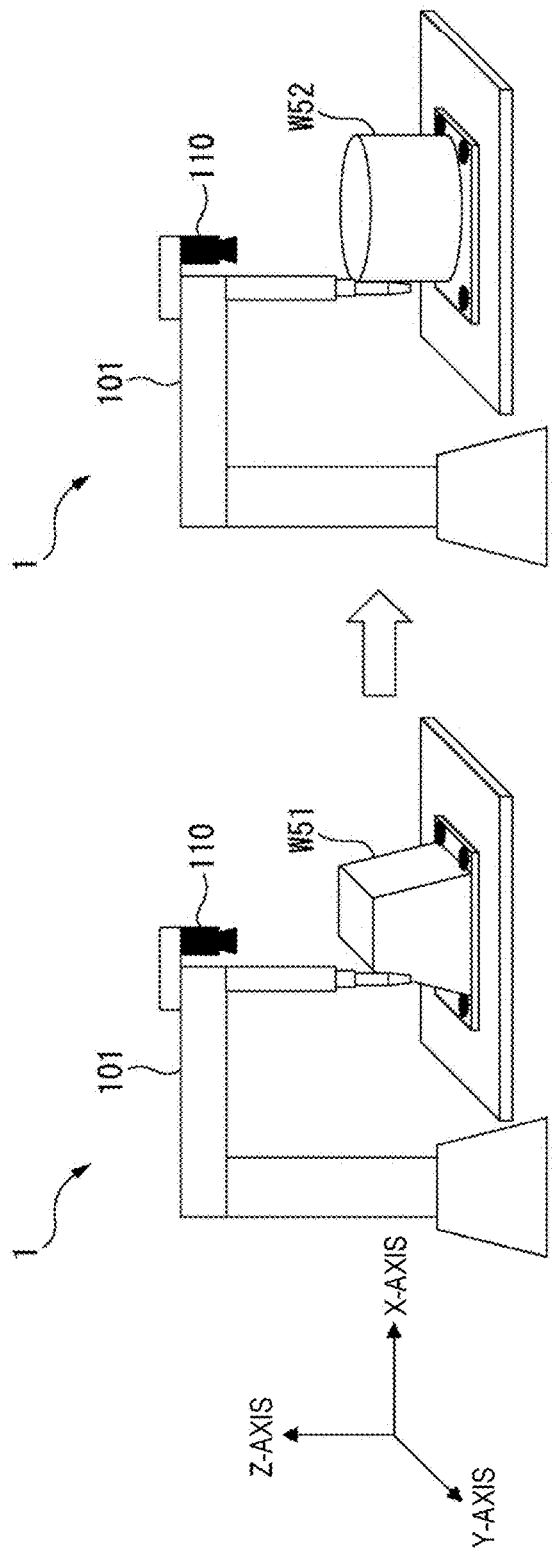
FIG. 5 is a diagram illustrating a situation in which a workpiece is photographed by a vision sensor in a machine tool.
Figure 6:
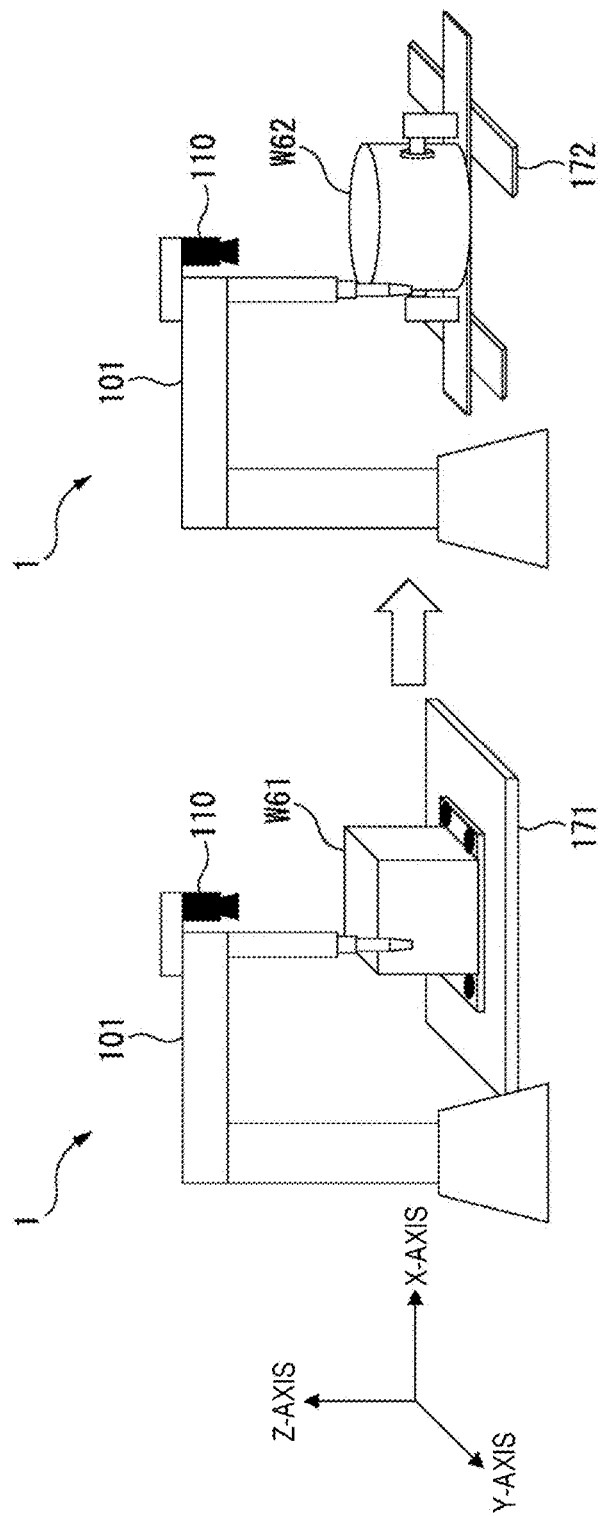
FIG. 6 is a diagram illustrating a situation in which a jig is photographed by a vision sensor in a machine tool.

Next, an example of the estimation operation by the first inertia estimating unit 11 when a vision sensor 110 (camera) is used as the external sensor 52 will be described. As illustrated in FIGS. 5 and 6, the vision sensor 110 is mounted on top of the spindle support 101, in a manner to be able to capture a machining area including at least a part of the driven body (e.g., workpiece or jig).

On the left side of FIG. 5, a situation is illustrated in which machining is performed on the workpiece W51 by the machine tool 1. On the right side of FIG. 5, a situation is illustrated in which machining is performed by the machine tool 1 on the workpiece W52 having a shape different from that of the workpiece W51. In the case of FIG. 5, the vision sensor 110 is attached to a position where the workpiece W51 (W52) can be photographed. The first inertia estimating unit 11 obtains an image in which the vision sensor 110 has captured, for example, an area including the workpiece at the start of machining. The first inertia estimating unit 11 compares the image of the workpiece W51 obtained in the last machining with the image of the workpiece W52 obtained in the present machining to determine whether the shape of the workpiece has changed. Here, the shape of the workpiece in the image may be specified and compared by extracting, for example, a region having a color tone specific to the workpiece from the obtained image. Other image recognition techniques may be used to extract features from the image and identify workpiece in the image.

When it is determined that there is a change in the shape of the workpiece by the comparison using the two-dimensional image of the workpiece, the first inertia estimating unit 11 causes the second inertia estimating unit 12 to execute the estimation of the inertia.

FIG. 6 is a diagram for describing an example of detecting the shape of the jig by the vision sensor 110. On the left side of FIG. 6, a situation is illustrated in which machining is executed by the machine tool 1, on the workpiece W61 fixed to the jig 171. On the right side of FIG. 6, a situation is illustrated in which machining is executed by the machine tool 1, on the workpiece W62 fixed to the jig 172. In the case of FIG. 6, the vision sensor 110 is disposed at a position where at least a part of the jig 171 (jig 172) can be photographed. The first inertia estimating unit 11 obtains an image including the jig, obtained by the vision sensor 110. The first inertia estimating unit 11 compares the image of the jig 171 obtained in the last machining with the image of the jig 172 obtained in the present machining to determine whether the shape of the jig has changed. Here, the shape of the jig in the image may be specified and compared by extracting, for example, a region having a color tone specific to the jig from the obtained image. Other image recognition techniques may be used to extract features from the image and identify the jig in the image.

When it is determined that the shape of the jig has changed by the comparison using the two-dimensional image of the jig, the first inertia estimating unit 11 assumes that the shape of the workpiece has changed and estimates that the inertia of the driven body has changed. Next, the first inertia estimating unit 11 causes the second inertia estimating unit 12 to execute the estimation of the inertia. The present operation example is a method for indirectly detecting that the shape of the workpiece has changed by detecting the shape of the jig. Therefore, an advantage is obtained in a situation where the workpiece cannot be directly viewed from the position of the vision sensor 110.

(5) Three-Dimensional Coordinate by the Vision Sensor

Next, an operation example in the case where a three-dimensional sensor (a stereo camera, etc.) capable of obtaining three-dimensional information of a target object is used as the vision sensor 110 will be described. Assume that three-dimensional coordinate information (three-dimensional image) of an area including the workpiece W51 and the workpiece W52 is obtained in the situation of FIG. 5 by using a three-dimensional sensor as the vision sensor 110. In this case, the first inertia estimating unit 11, for example, identifies the workpiece as a mass of object present on the work table in the three-dimensional image. The first inertia estimating unit 11 compares the three-dimensional shape information of the workpiece W51 and the workpiece W52 identified in this way. Thus, the first inertia estimating unit 11 can more accurately detect whether the shape (e.g., volume) of the workpiece has changed. Other image processing techniques may be used to specify the workpiece based on the feature amount in the three-dimensional image.

Consider the case where three-dimensional coordinate information of an area including the jig 171 and the jig 172 is acquired as illustrated in FIG. 6 by using a three-dimensional sensor as the vision sensor 110. In this case, the first inertia estimating unit 11 may specify, for example, an object at a predetermined distance from the vision sensor 110, as the jig by using the three-dimensional coordinate information. The first inertia estimating unit 11 compares the three-dimensional shape information of the jig 171 and the jig 172 specified in this way. Thus, the first inertia estimating unit 11 can more accurately detect whether the shape of the jig has changed. Other image processing techniques may be used to specify the jig based on the feature amount in the three-dimensional image. This operation example is a technique for indirectly detecting, by detecting the shape of the jig, that the shape of the workpiece has changed. Therefore, an advantage is obtained in a situation where the workpiece cannot be directly viewed from the position of the vision sensor 110.

(6) Number of Machining Types

Figure 7:
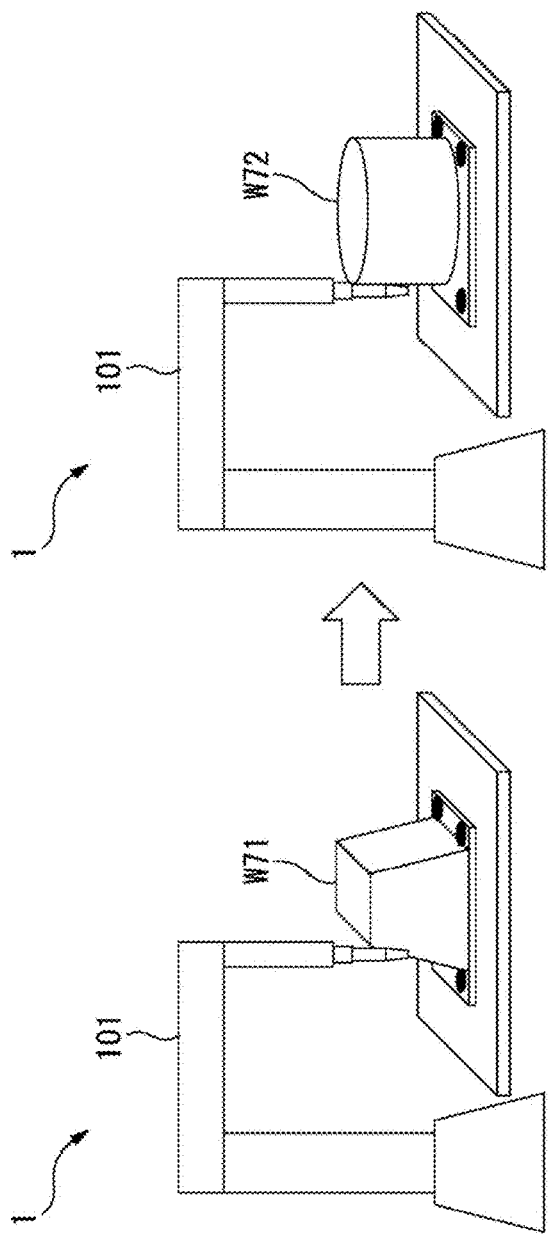
FIG. 7 is a diagram for describing the difference in the number of types of machining due to the difference in a workpiece.

In general, the machining program of the numerical control (CNC) has a configuration in which a subroutine describing specific machining is provided for each type of machining under a main flow for controlling the whole machining flow. Therefore, the number of types of machining can be grasped by extracting the number of subroutines in the machining program. The first inertia estimating unit 11 obtains the number of machining types from the machining program held by the host controller 20. The first inertia estimating unit 11 compares the number of types of machining extracted from the program executed last time with the number of types of machining extracted from the program executed this time. On the left side of FIG. 7, a situation is illustrated in which machining is executed on the workpiece W71 using a program by the machine tool 1. On the right side of FIG. 7, a situation is illustrated in which, in the machine tool 1, machining is executed, by a program different from that for the workpiece W71, on the workpiece W72 having a shape different from that of the workpiece W71. In this case, since the shape of the workpiece is different, the content of the specific machining is different, the number of types of machining is also different.

When the number of types of machining in the last program is different from the number of types of machining in the present program, the first inertia estimating unit 11 estimates that the inertia of the driven body 51 has changed due to a change in the shape of the workpiece. In this case, the first inertia estimating unit 11 causes the second inertia estimating unit 12 to execute the estimation of the inertia.

(7) Measurement During Non-Machining, Etc.

Figure 8:
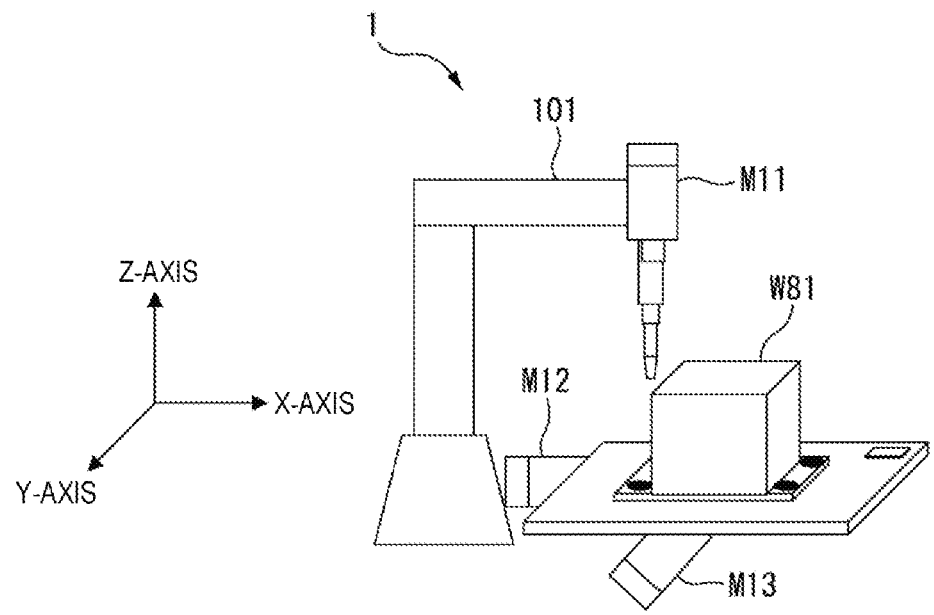

The first inertia estimating unit 11, during the execution of the machining program, may be configured to be able to estimate in a manner not to interrupt the machining program, or the like, whether the inertia has changed. In a first example of such an operation, in the case where the machining program is being executed and in a non-machining state, when a target axis for inertia estimation is stopped or moving at a constant speed (during so-called non-machining operation), the inertia is calculated by vibrating the axis. FIG. 8 illustrates the configuration of the machine tool 1. As illustrated in FIG. 8, the machine tool 1 includes a spindle motor M11 for driving the spindle axis at the tip of the spindle support 101. The machine tool 1 includes feed axis motors M12 and M13 for mowing the work table on which the work piece W81 is placed in the X-axis direction and in the Y-axis direction, respectively, both directions perpendicular to the spindle axis (Z-axis).

For example, assume that the target axis for inertia estimation is the axis in the X-axis direction. In this case, the first inertia estimating unit 11 detects a state in which the feed axis motor M12 is stopped or operating at a constant speed during non-machining, for example, by using feedback information from the sensor 42. When such a state is detected, the first inertia estimating unit 11 applies vibration to the feed axis, and calculates inertia $J[kgm^2]$ by the following equation of motion (2) from acceleration $a [rad/s^2]$ and torque $T[N/m]$ at this time. The torque $T[Nm]$ can be obtained by multiplying the current value fed back from the current control unit 4 by a coefficient.

$$Ja = T \quad (2)$$

Since the purpose here is to determine whether the inertia has changed, the calculation of the inertia value can be executed in a shorter time than the time required for the second inertia estimating unit 12 to estimate the inertia. When the inertia detected by the above vibrating operation is different from the inertia detected by such a vibrating operation last time (e.g., when the difference in inertia exceeds a predetermined threshold), the first inertia estimating unit 11 may interrupt the machining program by notifying the host controller 20 and may cause the second inertia estimating unit 12 to accurately estimate the inertia.

(8) Measurement During Constant Acceleration

Figure 9:
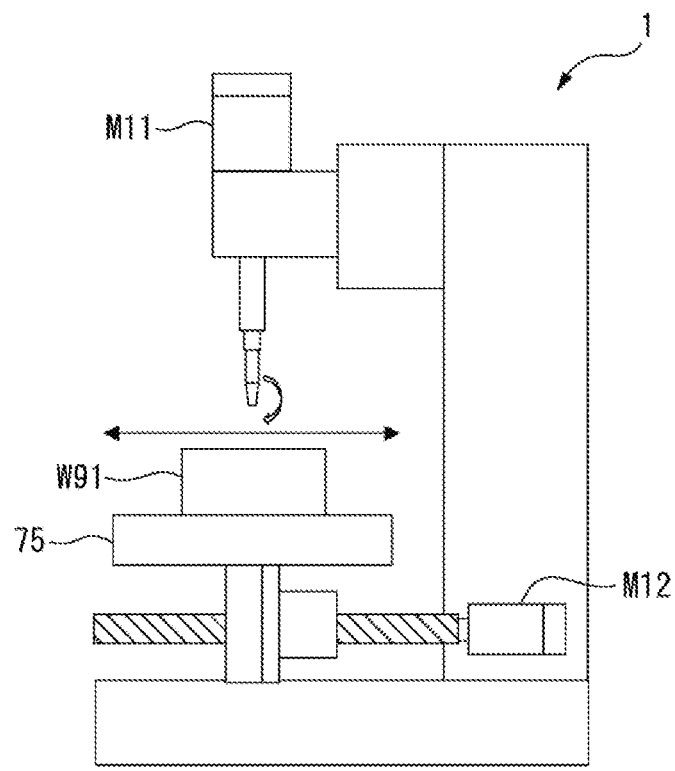
FIG. 9 is a diagram for describing an operation of estimating a change of the inertia of a driven body during a constant acceleration operation of a feed axis.
Figure 10:
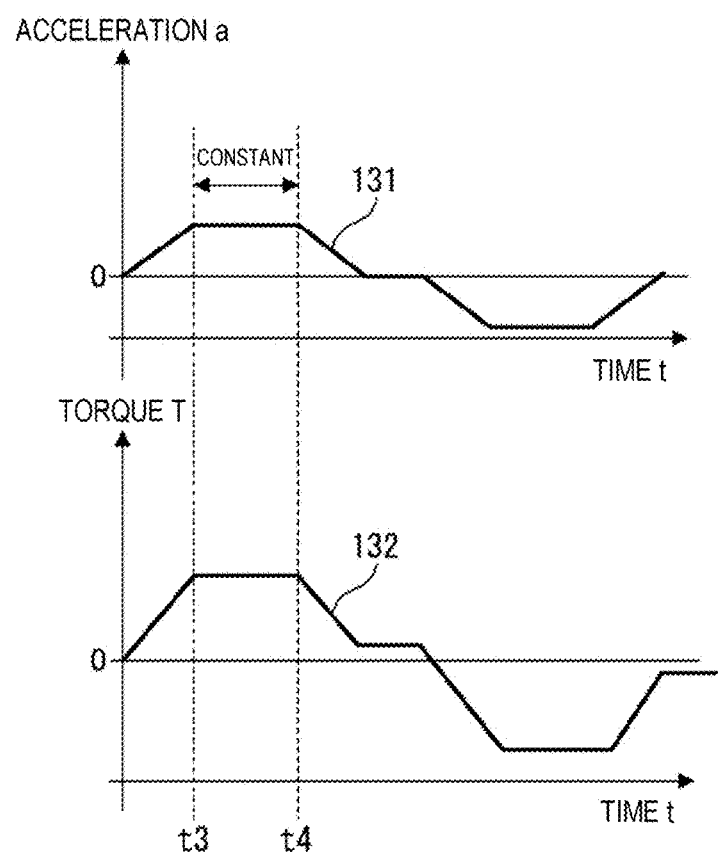
FIG. 10 is a diagram illustrating an example of the time transition of acceleration and torque of a feed axis.

A second example of an operation in which during the execution of the machining program, it is possible to estimate in a manner not to interrupt the machining program, whether the inertia has changed. In this operation example, in the case where the machining program is being executed and in a non-machining state, when an axis as target for inertia estimation is operating at a constant acceleration, the first inertia estimating unit 11 calculates the inertia with respect to the axis. FIG. 9 illustrates the configuration of the machine tool 1. As illustrated in FIG. 9, in the machine tool 1, the work table 75 on which the workpiece W91 is placed moves by a feed mechanism driven by the feed axis motor M12. FIG. 10 illustrates a time transition of acceleration (graph 131) and a time transition of torque (graph 132), as an example of drive control of the feed axis motor M12. The first inertia estimating unit 11 uses the information from the sensor 42, for example, and detects a state of constant acceleration a (e.g., a period between times t3 and t4 in FIG. 10). Then, the first inertia estimating unit 11 calculates the inertia of the target axis by the equation of motion (2) when the acceleration a is in a constant state.

When the inertia calculated by the above operation is different from the inertia calculated by the last similar operation (e.g., when the difference in inertia exceeds a predetermined threshold), the first inertia estimating unit 11 may interrupt the machining program by notifying the host controller 20 and may cause the second inertia estimating unit 12 to accurately estimate the inertia.

(9) Estimation from the Torque Waveform

Figure 11A:
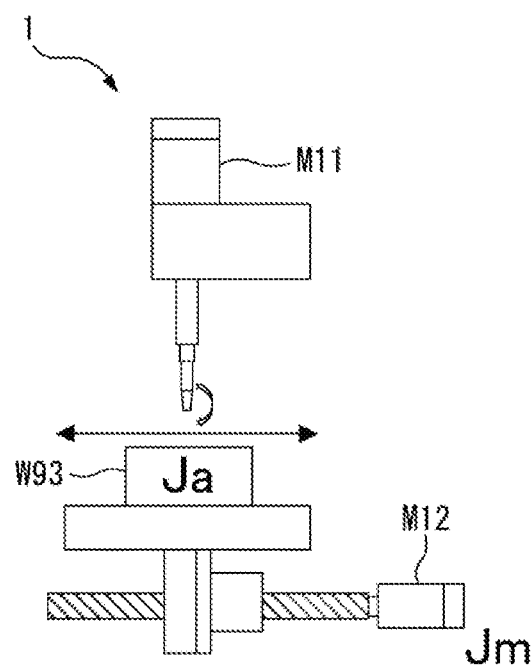
FIG. 11A is a diagram for describing a situation in which workpieces different in inertia are used for a machine tool.
Figure 11B:
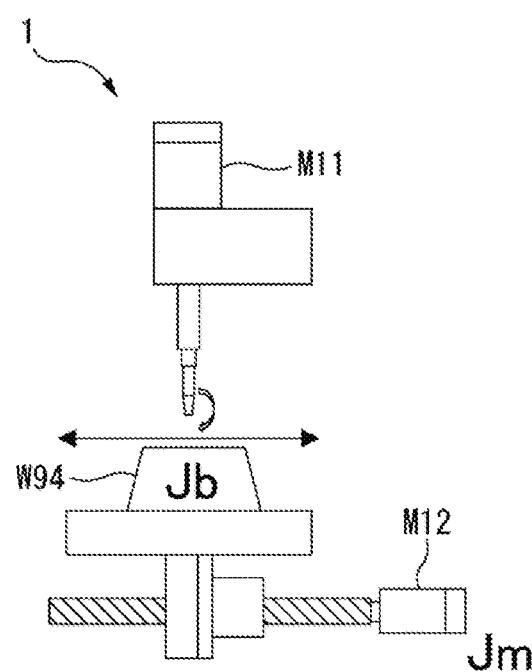
FIG. 11B is a diagram for describing a situation in which workpieces different in inertia are used for a machine tool.

A third example of an operation in which during the execution of the machining program, it is possible to estimate in a manner not to interrupt the machining program, whether the inertia has changed. The first inertia estimating unit 11 may be configured to estimate, based on the position of the frequency peak obtained by frequency analysis of the time waveform of the torque command for the axis as target for inertia estimation, whether the inertia of the axis has changed (whether the shape of the workpiece has changed). The position of the frequency peak obtained by frequency analysis of the time waveform of the torque command varies depending on the resonance frequency of the mechanical system. As illustrated in FIGS. 11A and 11B, a situation is assumed in which the workpiece W93 (inertia Ja) and the workpiece W94 (inertia Jb) different in inertia are machined by the machine tool 1. The inertia of the driven body of the feed axis (feed axis motor M12) without the workpiece, is Jm common to the both workpieces.

Figure 12A:
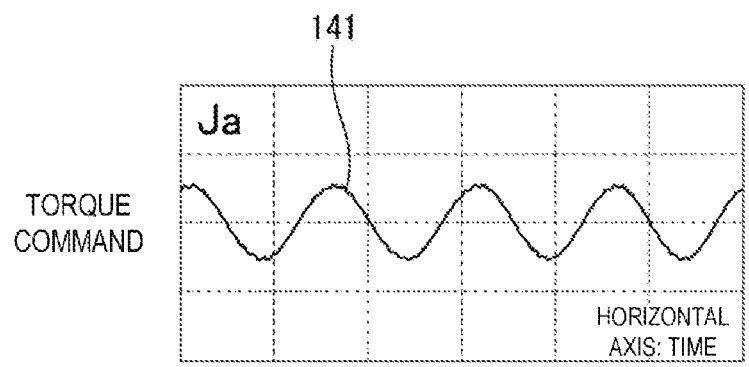
FIG. 12A is a diagram illustrating a time waveform of a torque command in the situation of FIG. 11A.
Figure 12B:
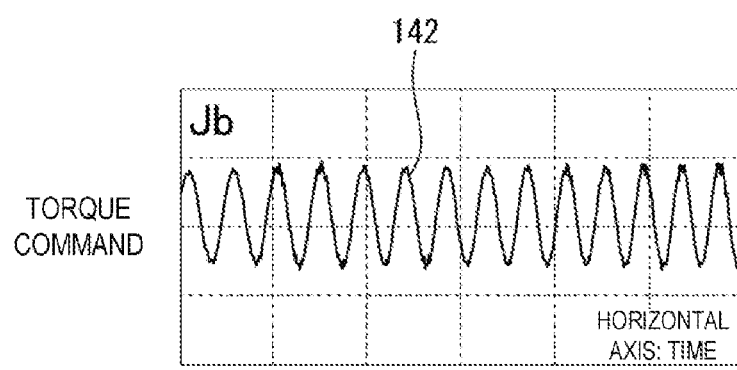
FIG. 12B is a diagram illustrating a time waveform of a torque command in the situation of FIG. 11B.
Figure 13A:
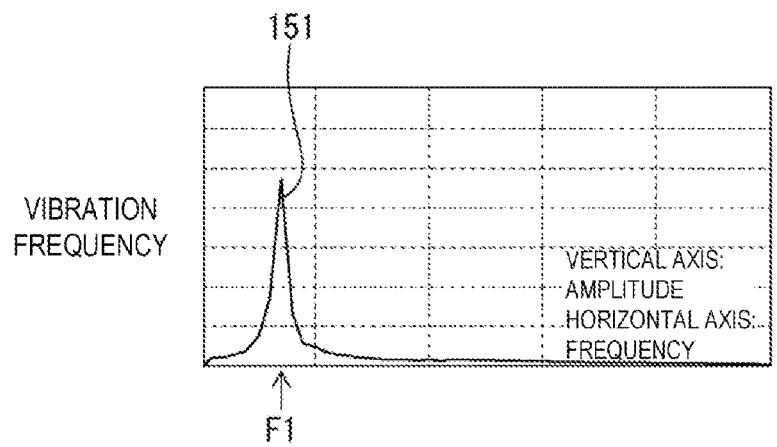
FIG. 13A is a diagram illustrating a frequency characteristic of the time waveform of the torque command of FIG. 12A.
Figure 13B:
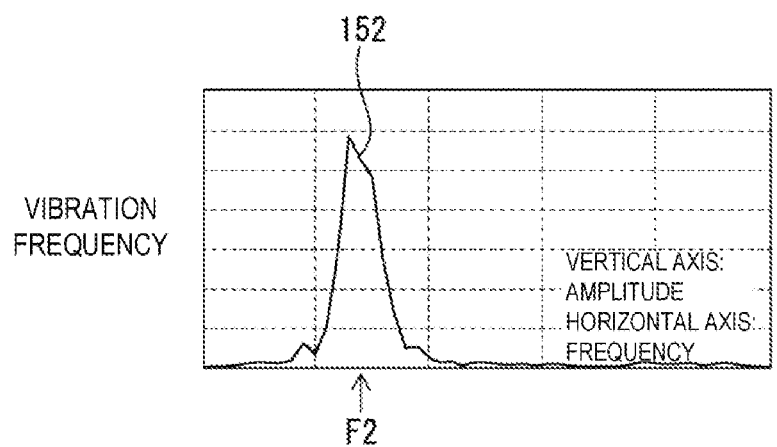
FIG. 13B is a diagram illustrating a frequency characteristic of the time waveform of the torque command of FIG. 12B.

FIGS. 12A and 12B illustrate the time waveforms 141 and 142 of the feed axis torque command in the situation of FIGS. 11A and 11B, respectively. FIGS. 13A and 13B illustrate frequency characteristics 151 and 152 obtained by Fast Fourier Transform (FFT) frequency analysis of the time waveforms 141 and 142 of FIGS. 12A and 12B, respectively.

As illustrated in FIGS. 13A and 13B, when the workpieces are different from each other, a frequency F1 and a frequency F2 of the frequency peak of the time waveform of the torque command are different from each other. When the frequency F1 of the frequency peak position at the last detection is different from the frequency F2 of the frequency peak position at the present detection, the first inertia estimating unit 11 estimates that the inertia has changed (i.e., a situation in which the shape of the workpiece has changed), and causes the second inertia estimating unit 12 to execute the estimation of the inertia.

As described above, according to the present embodiment, the inertia estimation function can be activated by automatically estimating whether the inertia has changed.

Although the present invention has been described using exemplary embodiments, those skilled in the art will appreciate that modifications and various other modifications, omissions, and additions may be made to each of the above embodiments without departing from the scope of the present invention.

The configuration of the controller according to the above-described embodiments can be applied to the controller of a robot, or the controller of other industrial machine including a drive axis driven by an electric motor.

The configuration of the controller 10 illustrated in FIG. 1 may be achieved by the CPU of the controller 10 executing various types of software stored in a storage device, or may be achieved by a configuration mainly composed of hardware such as an Application Specific Integrated Circuit (ASIC). The program for executing the control method corresponding to the processing contents described above, which is executed by the first inertia estimating unit 11 and the second inertia estimating unit 12, can be recorded on various recording media (e.g., which includes: a semiconductor memory such as a ROM, an EEPROM, a flash memory; a magnetic recording medium; an optical disk such as a CD-ROM, a DVD-ROM, etc.) readable by a computer.

REFERENCE SIGNS LIST

1 Machine tool
2 Position control unit
3 Speed control unit
4 Current control unit
10 Controller
11 First inertia estimating unit
12 Second inertia estimating unit
20 Host controller
30 Amplifier
31 Current amplifying circuit
41 Electric motor
42 Sensor
51 Driven body
52 External sensor
101 Spindle support
110 Vision sensor

The invention claimed is:

1. A controller for an electric motor, comprising:
a first inertia estimating unit configured to estimate whether inertia of a driven body has changed, based on at least one of first information related to an operation program or an operation setting of a device equipped with the electric motor, second information obtained from a detection device configured to detect a shape of the driven body driven by the electric motor, or third information representing an operation state of the electric motor; and a second inertia estimating unit configured to estimate the inertia of the driven body when the inertia of the driven body is estimated by the first inertia estimating unit to have changed.

2. The controller for an electric motor of claim 1, wherein the second information is a two-dimensional image or three-dimensional coordinate information of at least a part of the driven body obtained by a vision sensor as the detection device, and the first inertia estimating unit determines whether the shape of the driven body has changed based on the two-dimensional image or the three-dimensional coordinate information, and estimates that the inertia of the driven body has changed when determining that the shape of the driven body has changed.

3. The controller for an electric motor of claim 1, wherein the second information is identification information specific to the driven body read, by a reader as the detection device, from an identification information retaining body attached to the driven body, and the first inertia estimating unit estimates whether the inertia of the driven body has changed, based on the identification information of the driven body read by the reader.

4. The controller for an electric motor of claim 1, wherein the first inertia estimating unit, when determining, based on the first information, that the operation program executed last time is different from the operation program to be executed this time, estimates that the inertia of the driven body has changed.

5. The controller for an electric motor of claim 1, wherein the first information is information related to a start time or an end time of the operation program, and the first inertia estimating unit, when a time interval between the end time of the operation program executed last time and the start time of the operation program executed this time exceeds a preset set time, estimates that the inertia of the driven body has changed.

6. The controller for an electric motor of claim 1, wherein the first information is information indicating the number of types of machining defined in the operation program, and the first inertia estimating unit, when the number of types of machining defined in the operation program executed last time differs from the number of types of machining defined in the operation program executed this time, estimates that the inertia of the driven body has changed.

7. The controller for an electric motor of claim 1, wherein the device is a machine tool including a spindle axis and a feed axis as drive axes, the third information is information indicating the operation state of the electric motor provided on each of the drive axes, and the first inertia estimating unit, when the machine tool is in a non-machining state and a target axis of the drive axes is stopped or operating at a constant speed, estimates whether the inertia of the driven body of the target axis has changed, by vibrating the target axis and measuring the inertia with respect to the target axis.

8. The controller for an electric motor of claim 1, wherein the third information is information representing acceleration of the electric motor, and the first inertia estimating unit, when the acceleration of the electric motor is constant, estimates whether the inertia of the driven body has changed by measuring the inertia of the driven body of the electric motor.

9. The controller for an electric motor of claim 1, wherein the third information is information related to a waveform of time transition of a torque command to the electric motor, and the first inertia estimating unit, when a position of a frequency peak obtained by frequency analysis of the waveform has changed, estimates that the inertia of the driven body has changed.

* * * * *